United States Patent [19]

Hoff

[11] 4,446,288
[45] May 1, 1984

[54] POLYMERIZATION METHOD

[75] Inventor: Raymond E. Hoff, Palatine, Ill.

[73] Assignee: Chemplex Company, Rolling Meadows, Ill.

[21] Appl. No.: 337,151

[22] Filed: Jan. 4, 1982

Related U.S. Application Data

[62] Division of Ser. No. 260,802, May 5, 1981, Pat. No. 4,402,861.

[51] Int. Cl.$^3$ .......................... C08F 4/02; C08F 10/02
[52] U.S. Cl. ..................... 526/129; 526/142; 526/156; 526/348.6; 526/352
[58] Field of Search ............... 526/129, 151, 142, 124

[56] References Cited

U.S. PATENT DOCUMENTS

| | | | |
|---|---|---|---|
| 3,647,772 | 3/1972 | Kashiwa | 526/124 |
| 3,787,384 | 1/1974 | Stevens et al. | 526/129 |
| 4,105,585 | 8/1978 | Matheson | 526/159 |
| 4,110,523 | 8/1978 | Schweier et al. | 526/124 |
| 4,130,699 | 12/1978 | Hoff et al. | 526/124 |
| 4,258,159 | 3/1981 | Bienfait | 526/124 |
| 4,263,168 | 4/1981 | Rochefort et al. | 526/129 |
| 4,263,171 | 4/1981 | Shida et al. | 526/129 |

FOREIGN PATENT DOCUMENTS

| | | |
|---|---|---|
| 2543219 | 4/1977 | Fed. Rep. of Germany ...... 526/124 |
| 2721058 | 11/1978 | Fed. Rep. of Germany . |
| 2721094 | 11/1978 | Fed. Rep. of Germany . |
| 69/3534 | 10/1969 | South Africa . |

OTHER PUBLICATIONS

Bradley et al., Metal Alkoxides, Academic Pren., N.Y., p. 39 (1978).

*Primary Examiner*—Edward J. Smith
*Attorney, Agent, or Firm*—Wood, Dalton, Phillips, Mason & Rowe

[57] ABSTRACT

An olefin polymerization and copolymerization catalyst active in the presence of an alkyl aluminum cocatalyst is prepared by mixing, in the presence of a solvent, particles of a silica or alumina material having reactive surface groups, and a magnesium alkyl or a magnesium alkyl-aluminum alkyl complex of the general formula $(MgR_2)_m(AlR'_3)_n$ where R and R' are alkyl groups and m/n is between about 0.5 and 10, inclusive, to form a hydrocarbon insoluble reaction product which is then mixed, in the presence of a solvent, with an electron-donating alcohol and a titanium, vanadium or zirconium halide, oxyhalide or alkoxyhalide, followed by removal, such as by evaporation, of the solvent to give a dry, granular, solid catalyst.

5 Claims, No Drawings

POLYMERIZATION METHOD

This is a division of application Ser. No. 260,802 filed May 5, 1981, now U.S. Pat. No. 4,402,861.

BACKGROUND OF THE INVENTION

The titanium containing catalyst of this invention is highly active and is suitable for polymerization of ethylene and other 1-olefins, particularly of 2-8 carbon atoms, and copolymerization of these with 1-olefins of 2-20 carbon atoms, such as propylene, butene and hexane, for example, to form copolymers of low- and medium-densities. It is equally well suited for particle form, gas phase and solution polymerization processes, and is especially effective in the selective production of high-density polyethylene having a narrow molecular weight distribution and high melt index for injection molding applications.

The catalyst of this invention has an enhanced sensitivity to molecular weight control by hydrogen. This makes it possible to make high melt index particle form polyethylene with less hydrogen and at a lower polymerization temperature. The catalyst is also well suited for the production of high-strength fibers or film having a low melt index.

The catalyst does not require an excess of titanium and therefore obviates the need for removal of catalyst residues from product polymer. The catalyst is suitable for use in particle form polymerization plants designed for prior silica-supported chromium oxide catalysts. Heretofore, titanium catalysts have not been extensively used in such plants due to the substantial excess of corrosive titanium compounds typically used in the preparation of such catalysts. The present catalyst is easily injected into particle form reactors by means of well known automatic feeding valves, and corrosion-resistant materials of construction are not required.

The most pertinent prior art known to me is as follows:

South Africa Appl. No. 69/3534, 10/5/69 by Van Den Berg and Tomiers of Stamicarbon describes catalysts made from organomagnesium compounds, alkyl aluminum chloride compounds, and titanium compounds which are increased in reactivity by the addition of alcohols. A support, or granular ingredient, is not used, there is no separation of the solvent, and the use of a cocatalyst is not part of the disclosure.

German Off. 2,721,058, Nov. 23, 1978 by Gunter Schweier et al. of BASF reveals a catalyst with a porous inorganic oxide like silica or silica-alumina as a support. A solution of a reaction mixture of an alcohol, a titanium trihalide, and a magnesium compound is added to the oxide, and then the solvent (i.e. the alcohol) is evaporated giving an intermediate solid product. This solid product is suspended in a solution of organometallic compound, which may be an alkyl aluminum or silicon halide compound. The suspended solid component may be used as is along with an organometallic compound as a cocatalyst. The suspended solid compound can also be filtered, and washed prior to use, and for gas phase polymerization it can be coated with wax. The magnesium compounds are not alkyl magnesium compounds but alkoxides and halides and other types of compounds. Another Schweier patent, German Off. 2,721,094 is similar to this one. It reveals that the silica or silica-alumina may be treated with an alkyl aluminum halide compound beforehand. U.S. Pat. No. 4,110,523, Aug. 29, 1978, also be Schweier et al. covers a similar catalyst. In this case, the treatment with the alkyl aluminum or silicon halide solution is eliminated.

U.S. Pat. No. 4,130,699, Dec. 19, 1978 by G. R. Hoff and Peter Fotis of Standard Oil discloes a supported catalyst for vapor phase polymerization which are made less active prior to feeding to the reaction vessel by treatment with alcohols, acetates, ketones, aldehydes, or esters.

U.S. Pat. No. 4,105,585, Aug. 8, 1978 by Ian Matheson of BP Chemicals describes a catalyst prepared from the reaction of magnesium powder, a titanium halide and alcohol.

U.S. Pat. No. 3,647,772 by N. Kashiwa (Mitsui Petrochemical, May 7, 1972) involves treating anhydrous magnesium carbonate with polar organic compounds including alcohols. When this is done, more titanium from titanium tetrachloride can be fixed upon the magnesium carbonate. Catalyst reactivity, melt index and bulk density of the product are increased by the treatment with the polar organic compound.

SUMMARY OF THE INVENTION

The catalysts of this invention give particle form polyethylene of increased bulk density and more uniform particle size distribution than the catalysts of the above South Aftica 69/3534. In addition, there is a decreased degree of reactor fouling. These improvements are retained in the catalysts of this invention which have the additional improvement of an increased hydrogen sensitivity.

The improved catalyst of the invention is prepared by combining, in the presence of a solvent, a magnesium alkyl or a magnesium-aluminum complex of the general formula $(MgR_2)_m(AlR_3')_n$ with preactivated particles of an inorganic oxide material having reactive groups. These reactive groups may be hydroxyls and/or oxide linkages or similar surface groups. The reaction product thereby produced is then reacted, in the presence of a solvent, with a halogen-containing transition metal compound to form a supported catalyst component, followed by evaporation of the solvent. The catalyst component prepared according to the foregoing is active in the presence of an effective quantity of an alkyl aluminum cocatalyst, preferably comprising a trialkyl aluminum compound.

In this invention:

(1) The alcohol is either added to the solid inorganic oxide prior to the introduction of the organomagnesium compound or the alcohol is added to the mixture after the organomagnesium compound.

(2) The molar ratio of the alcohol to the organomagnesium compound is from 0.1 to 10.

(3) The alcohol contains only carbon, hydrogen, and oxygen, and does not have an aromatic ring bonded directly to the alcohol hydroxyl group.

(4) The catalyst preparation reaction is conducted at temperatures from about 15° C. to about 100° C. with room temperatures being completely satisfactory.

(5) Solvents added during the preparation are removed to yield a free-flowing catalyst.

The inorganic oxide material is chosen from the group consisting of silica, alumina and silica-alumina. The inorganic oxide material is utilized in finely divided form and is preactivated by heating in an inert atmosphere at temperatures of up to about 900° C.

The magnesium-aluminum complex is of the general formula $(MgR_2)_m(AlR_3')_n$ where R and R' are alkyl groups and m/n is between about 0.5 and 10, inclusive. R and R' may be the same or different alkyl groups of one to about 12 carbon atoms.

Magnesium alkyls are of this general formula $MgR_2$ when R is an alkyl group of one to about 12 carbon atoms.

The optimum amount of organomagnesium compound depends upon the surface area of the reactive oxide and the concentration of polar groups on the reactive oxide surface. For highest reactivity, the molar ratio of the organomagnesium compound to the polar groups should be at least one.

The transition metal compound is of the general formula $Tr(OR)_aX_{4-a}$ or $TrOX_3$ wherein Tr is a transition metal selected from the group consisting of titanium, vanadium and zirconium, R is an alkyl group of one to about 20 carbon atoms, X is a halogen atom and a is zero or an integer of one to 4. Titanium compounds are preferred for highest reactivity.

The transition metal compound is reacted with the reaction product of the magnesium compound and the inorganic material, preferably in equimolar ratio, so that the resultant solid catalyst component incorporates substantially all of the titanium in a highly active form. It is therefore unnecessary to remove nonreactive titanium from the catalyst or from product polymer, as opposed to prior titanium catalysts which usually require excessive titanium during preparation.

Modification of the catalysts by alcohols has a tendency to decrease their reactivity. In some cases, the titanium weight percent in the catalyst can be increased in order to offset this tendency. For example, catalysts can be made by reacting dry Davison grade 952 silica with first a magnesium compound and then titanium tetrachloride. According to this invention, such a catalyst can be modified by the addition of, for example, n-butyl alcohol to the reaction product of the silica and the magnesium alkyl compound. In this case, it is desirable to increase the titanium content when larger amounts of alcohol are used. The following ratios and combinations are preferred in this invention:

| n-Butyl Alcohol/ $R_2Mg$ | $TiCl_4$ mmols/g of 952 silica |
|---|---|
| 0.25 | 1.25 |
| 0.50 | 2.25 |
| 1.00 | 2.25 |
| 2.00 | 2.50 |

The ratios of alcohol to magnesium can be selected on the basis of the melt index desired. Normally, the Mg/Ti is about 1.0. Hence, as alcohol and $TiCl_4$ are increased with respect to the dry silica, the amount of organomagnesium compound must also be increased to remain in the preferred relation.

Due to the catalyst's high activity, a relatively high partial pressure of hydrogen may be used in order to result in a high product melt index. Also, the catalyst's high activity makes feasible copolymerization of olefins less reactive than ethylene.

The catalyst is, because of its high activity, equally well suited for use in the particle form polymerization process in which the solid catalyst component, the cocatalyst, and olefin monomer are contacted in a suitable solvent, such as the solvent used in the catalyst forming reaction, or in a gas phase process in which no solvent is necessary.

DESCRIPTION OF THE PREFERRED EMBODIMENTS

I. Preparation of the Inorganic Oxide Material

The reaction product catalyst of the invention is formed and is bonded to the surface of the inorganic oxide materials by reaction with active surface hydroxyl or oxide groups thereof. Polymerization reaction efficiency is dependent, to some extent, upon the physical characteristics, such as surface area, of the inorganic oxide material. Therefore, it is preferred to utilize the inorganic oxide material in finely divided form. The amount of titanium compound is determined with respect to the amount of magnesium compound within limits.

Suitable inorganic oxide materials include silica, alumina and silica-alumina, with silica being preferred. The inorganic oxide may contain small amounts of materials such as magnesia, titania, zirconia and thoria, among others.

It is necessary to dry and preactivate the inorganic oxide material by heating in an inert atmosphere at an elevated temperature before contact with the magnesium compound. In the case of Davison Chemical Company Grade 952 silica, optimum catalyst reactivities are obtained at an activation temperature of about 600° C. in a nitrogen atmosphere, although satisfactory results are obtained at temperatures between about 200° C. and 900° C.

II. Catalyst-Forming Reactants

1. The Organomagnesium Compound

Particles of the dried and preactivated inorganic oxide material are initially reacted with an organomagnesium compound ($MgR_2$), or organomagnesium-aluminum complex of the general formula $(MgR_2)_m(AlR_3')_n$ in which R and R' are the same or different alkyl groups and the ratio m/n is within the range of about 0.5 to about 10, and preferably between about 2 and 10.

The alkyl groups R may be the same or different, and each has between 2 and 12 carbon atoms. When the R groups are identical, it is preferred that each has at least 4 carbon atoms, and are preferably butyl or hexyl groups. The alkyl groups R' are preferably ethyl groups.

The reaction between the magnesium alkyl compound and the inorganic oxide particles is carried out in a solvent, preferably at room temperature for convenience. The catalyst-forming reactions may be carried out at higher or lower temperatures, if desired. The alcohol is added to the inorganic oxide before or after the reaction with the magnesium alkyl compound.

The amount of the magnesium is chosen such that the total number of moles of magnesium is between about 0.1 to 10 times the number of moles of transition metal, the amount of which is chosen with reference to the weight of inorganic oxide, as is described below. It is preferred that magnesium be present in equimolar ratio to the transition metal compound.

The magnesium-aluminum complex is known in the art as disclosed in Aishima et al., 4,004,071 (Jan. 18, 1977) at col. 2, 11. 34–40 and col. 3, 11. 30–36. The complex is readily prepared according to the teachings of Ziegler et al., "Organometallic Compounds XXII: Organomagnesium-Aluminum Complex Compounds", *Annalen der Chemie,* Vol. 604, pages 93–97 (1957).

2. Alcohol

The alcohol may be added to the reactive oxide prior to the reaction with the magnesium alkyl or magnesium-aluminum complex. If this is done, then the magnesium alkyl solution must be added within a short time so that the previously added alcohol does not evaporate due to the flow of inert gas through the preparation vessel. The alcohol may also be added after the magnesium compound.

The alcohol contains only carbon, hydrogen, and oxygen atoms, and does not have an aromatic ring bonded directly to the alcohol hydroxyl group. Because of cost and convenience, ethyl, propy and butyl alcohols are preferred. Primary, secondary and tertiary alcohols are effective, but n-butyl alcohol is preferred.

The molar ratio of the alcohol to the organomagnesium compound may be from 0.1 to 10, but the greatest effect upon melt index and hydrogen sensitivity is in the range of 0.5 to 2.0. Consequently, the preferred molar ratio of alcohol to magnesium compound is between 0.5 and 2.0. The transition metal content of the catalyst may be increased at higher alcohol ratios to maintain high reactivity.

3. Transition Metal Compound

After the inorganic oxide particles are completely reacted with the organomagnesium compound and alcohol, a selected halogen-containing transition metal compound is reacted with the resulting hydrocarbon insoluble reaction product to form an active solid catalyst component. The catalyst-forming reaction is carried out in a solvent, preferably a hydrocarbon, and preferably at room temperature.

The transition metal compound is selected from those of the general formula $Tr(OR)_a X_{4-a}$ or $TrOX_3$ wherein Tr is titanium, vanadium, or zirconium, R is an alkyl group of one to about 20 carbon atoms, X is a halogen atom and a is zero or an integer of one to 4. Suitable transition metal halides include $TiCl_4$, $Ti(OR)Cl_3$, $Ri(OR)_2Cl_2$, $Ti(OR)_3Cl$, $VOCl_3$, $VCl_4$, $ZrCl_4$, and others commonly used in conventional Ziegler catalysts, with R being as defined above.

For optimum reactivity, the transition metal is added to the inorganic oxide-magnesium compound-alcohol reaction product in equimolar ratio to the total magnesium.

The ratio of transition metal compound with respect to the inorganic oxide material may vary over a relatively wide range, although it has been found that the best results are obtained with a transition metal content of between about 0.25 and 1.0 mmoles per mmole of active surface hydroxyl and oxide groups on the inorganic oxide material. Preferably, between 0.6 and 2.5 mmoles of transition metal compound should be added to the reaction mixture per gram of inorganic oxide material.

III. Solvent Evaporation

After formation of the solid catalyst component by reaction of the transition metal compound with the inorganic oxide-magnesium compound reaction product, the solvent present in the catalyst-forming reaction must be removed uner an inert atmosphere. For example, evaporation may occur at a temperature between about 90° C. and 100° C. under a nitrogen atmosphere for from about ½ to 10 hours, or until dry. Solvent evaporation is preferred to insure that product polymer is formed in small particles suitable for a particle form process reather than in sheets, fibers or chunks which rapidly foul the reactor and decrease reaction efficiency.

After solvent evaporation, the catalyst may advantageously be added to a solvent for reaction therein, as in the particle form polymerization process. The solvent added to the catalyst may be the same solvent used in the catalyst forming reaction, if desired, or may be any other suitable solvent. The catalyst exhibits no loss in activity due to addition to solvent.

Further, it has been found that although solvent evaporation is most typically carried out at an elevated temperature, it is evaporation and not heating which ensures desirable product characteristics. Evaporation may be carried out, if desired, at reduced pressure and temperature.

IV. Cocatalyst

The catalyst prepared as described above is active in the presence of an alkyl aluminum cocatalyst. Trialkyl aluminum compounds such as triisobutyl aluminum (TIBAL) are preferred cocatalysts. The alkyl aluminum compound is fed to the polymerization reaction zone separately from the solid catalyst component.

The proportion of cocatalyst to solid catalyst component may be varied, depending on the transition metal concentration in the solid catalyst component. In the case of TIBAL, excellent results have been obtained with as low as 4.6 mmole cocatalyst per gram of solid catalyst component.

V. Reaction Conditions

The particle form reaction system is characterized by the introduction of monomer to an agitated catalyst-solvent slurry. The solvent, typically isobutane, may be the solvent in which the catalyst preparation reaction is carried out. This type of reaction is best carried out in a closed vessel to facilitate pressure and temperature regulation. Pressure may be regulated by the addition of nitrogen and/or hydrogen to the vessel. Addition of the latter is useful for regulation of the molecular weight distribution and average molecular weight of product polymer, as is well known in the art. In this invention, the effect is enhanced by the incorporation of an alcohol into the catalyst.

Particle form polymerization of ethylene with the catalyst of this invention is best carried out at about 80° C. to 110° C. at a pressure of between 35 to 40 atmospheres. In gas phase polymerization, the temperature may range from less than about 85° C. to about 100° C. with a pressure as low as about 20 atmospheres. Copolymers may be produced by either process by addition of propylene, butene-1, hexene-1 and similar alpha-olefins to the reactor. Production of copolymers of relatively low density is preferably carried out at a relatively low temperature such as 60° C. to 80° C.

EXAMPLES 1-14

A series of catalysts was prepared according to the invention modified by the addition of an alcohol. The alcohol was added to the granular ingredient which in this case was Davison Chemical Company Grade 952 silica previously dried at about 600° C. The catalysts were tested, with the conditions and results given in the following Table, by adding the alcohol

TABLE

| Example No. | ALCOHOL | TiCl$_4$ mmol/g SiO$_2$ | ROH/Mg | Temp °F. | H$_2$ (psig) | Reactivity | MI |
|---|---|---|---|---|---|---|---|
| 1 | n-Butyl Alcohol | 2.75 | 0.54 | 221 | 50 | 3199 | 1.44 |
| 2 | n-Butyl Alcohol | 2.75 | 0.54 | 221 | 100 | 1292 | 24.7 |
| 3 | sec-Butyl Alcohol | 2.25 | 0.50 | 215 | 50 | 3291 | 1.54 |
| 4 | sec-Butyl Alcohol | 2.25 | 0.50 | 215 | 100 | 3766 | 5.80 |
| 5 | t-Butyl Alcohol | 2.25 | 0.50 | 221 | 50 | 4196 | 0.95 |
| 6 | t-Butyl Alcohol | 2.25 | 0.50 | 221 | 100 | 2494 | 8.13 |
| 7 | t-Butyl Alcohol | 2.25 | 0.50 | 215 | 50 | 1214 | 2.28 |
| 8 | t-Butyl Alcohol | 2.25 | 0.50 | 215 | 100 | 933 | 11.1 |
| 9 | cyclohexyl Alcohol | 2.25 | 0.50 | 215 | 50 | 3600 | 1.87 |
| 10 | cyclohexyl Alcohol | 2.25 | 0.50 | 215 | 100 | 1100 | 10.9 |
| 11 | benzyl Alcohol | 2.25 | 0.50 | 215 | 50 | 2199 | 1.78 |
| 12 | benzyl Alcohol | 2.25 | 0.50 | 215 | 100 | 1555 | 10.6 |
| 13 | None (Comparative) | 2.25 | — | 215 | 50 | 5583 | 0.58 |
| 14 | None (Comparative) | 2.25 | — | 215 | 100 | 5354 | 2.92 |

In each case, the molar ratio of TiCl$_4$ to R$_2$Mg was 1.0.
All parts and percentages herein are by weight.

specified. A quantity of dried silica was mixed under nitrogen with the alcohol, then dibutyl magnesium-triethyl aluminum complex in heptane solution was added. The combination was stirred for 30 minutes at ambient temperature before adding titanium tetrachloride. After the addition of the titanium tetrachloride, the reaction mixture was stirred for another 30 minutes. The flask was then immersed in an oil bath at a temperature of 90° C. for a period of 30 to 60 minutes, to give a dry, granular catalyst. From the Table it can be seen that the alcohol modification results in an increase in melt index with respect to the control experiments.

The following examples illustrate that the order of adding the magnesium compound and the alcohol may be reversed without affecting the alcohol's increasing the MI (melt index).

EXAMPLE 15

A catalyst was prepared using heated Davison grade 952 silica as described in Example 1, but the order of adding the ingredients was changed. In this case, 2.3 g of the silica was combined with 23 ml dry hexane and 9.7 ml of dibutyl magnesium-triethylaluminum complex solution. This volume of solution gave 1.75 millimoles of dibutyl magnesium per gram of silica. The combination was stirred at room temperature for thirty minutes under a flow of nitrogen, then 0.38 ml of n-butyl alcohol was added. The calculated molar ratio of dibutyl magnesium to n-butyl alcohol was 1.0. The reaction mixture containing the alcohol was then stirred for another thirty minutes before 0.44 ml of titanium tetrachloride was added. The Mg/Ti atomic ratio was 1.0. After another thirty minutes reaction time, the flask was immersed in an oil bath at a temperature of 98° C. The flask was kept in the hot oil bath until the catalyst was free of solvent. The evaporation was aided by a flow of nitrogen through the flask which was maintained continuously.

A portion of the dry catalyst was tested for making a low density ethylene-butene-1 copolymer. As in previous examples, triisobutylaluminum was the cocatalyst. The amount of triisobutylaluminum was 9.2 millimoles per gram of catalyst. Catalyst and cocatalyst solution were mixed with 500 ml isobutane at 160° F. in a 1400 ml polymerization vessel. Hydrogen was added to give a 50 psi increase in pressure, then ethylene and butene-1 were introduced simultaneously. The amounts were selected to give 22 wt.% butene at a total pressure of 350 psig. Ethylene was then fed as required to keep the pressure constant at 350 psig. Butene-1 was pumped into the polymerization vessel at a constant rate of 15 g/hr.

At the end of the polymerization test, the polymer product was found to have a density of 0.917 g/cm$^3$ and a melt index of 3. The reactivity was 5500 g/g cat/hr. Since similar catalysts without the addition of alcohol give low density copolymer with a melt index of about 1.0 under these conditions, this example shows that the alcohol can be added after the magnesium compound and result in an increase in melt index.

EXAMPLE 16

The catalyst of Example 15 was also tested in ethylene homopolymerization. The conditions of polymerization were the same as in Example 4, that is 215° F. with 100 psi of added hydrogen. However, a reactor of larger capacity was employed so that the 100 psi corresponds to a larger quantity of hydrogen. The results of two tests under these conditions (Tests A and B) were as follows:

|  | Test A | Test B |
|---|---|---|
| TiCl$_4$ mmol/g SiO$_2$ | 1.75 | 1.75 |
| ROH/$_{Mg}$ | 1.0 | 1.0 |
| Temp °F. | 215 | 215 |
| psi H$_2$ | 100 | 100 |
| Reactivity | 911 | 900 |
| Melt Index | 48 | 47 |

A similar catalyst without alcohol in this larger reactor vessel yields an ethylene polymer with a melt index of about 10. Therefore, this example again shows that the alcohol can be added after the magnesium compound and will produce an increased melt index.

I claim:
1. The method of polymerizing or copolymerizing ethylene which comprises polymerizing or copolymerizing said ethylene under polymerizing conditions in the presence of an alkyl aluminum cocatalyst and an olefin polymerization and copolymerization catalyst active in the presence of said cocatalyst, said catalyst being prepared by the consecutive steps of:
   (a) preactivating and drying particles of silica by heating said particles at between about 200° C. and 900° C.;
   (b) reacting said dry particles in the presence of a hydrocarbon solvent with butyl alcohol and a complex of the general formula (MgR$_2$)$_m$(AlR$_3$')$_n$ wherein R and R' are the same or different alkyl groups of 2 to 10 carbon atoms and m/n is between about 0.5 to 10, inclusive, to form a reaction mixture of said solvent and a first reaction product insoluble in said solvent, the molar ratio of said alcohol to said magnesium complex being in the range of about 0.5 to about 1.0;

(c) thereafter reacting said first reaction product in said reaction mixture with a halogen-containing titanium compound to form a second reaction product, the molar ratio of said magnesium compound to said titanium compound being about 1.0, and between about 2.25 and 2.50 mmoles of said titanium compound being present per gram of silica, said titanium compound comprising $TiX_4$ wherein X is a halogen atom; and (d) removing said solvent from said second reaction product.

2. The method of claim 1 wherein m/n is between about 2 and 10.

3. The method of claim 1 wherein said silica particles are preactivated by heating at about 600° C.

4. The method of claim 1 wherein R is butyl, R' is ethyl, and m/n is about 6.5.

5. The method of claim 1 wherein said titanium compound is $TiCl_4$.

* * * * *